(12) United States Patent
Marciante et al.

(10) Patent No.: US 12,339,473 B2
(45) Date of Patent: Jun. 24, 2025

(54) HIGH BANDWIDTH IMMERSION GRATING

(71) Applicant: RAM Photonics, LLC, San Diego, CA (US)

(72) Inventors: John R. Marciante, Webster, NY (US); Jordan P. Leidner, Rochester, NY (US)

(73) Assignee: RAM Photonics Industrial, LLC, Webster, NY (US)

( * ) Notice: Subject to any disclaimer, the term of this patent is extended or adjusted under 35 U.S.C. 154(b) by 655 days.

(21) Appl. No.: 17/397,348

(22) Filed: Aug. 9, 2021

(65) Prior Publication Data

US 2022/0043191 A1 Feb. 10, 2022

Related U.S. Application Data

(60) Provisional application No. 63/062,773, filed on Aug. 7, 2020.

(51) Int. Cl.
*G02B 5/18* (2006.01)
(52) U.S. Cl.
CPC ..................... *G02B 5/18* (2013.01)
(58) Field of Classification Search
CPC ....... G02B 5/18; G02B 5/1814; G02B 5/1861
See application file for complete search history.

(56) References Cited

U.S. PATENT DOCUMENTS

| | | | | |
|---|---|---|---|---|
| 8,593,732 | B1* | 11/2013 | Greiner | G02B 5/18 359/485.05 |
| 9,297,937 | B1* | 3/2016 | Greiner | G02B 5/3058 |
| 10,802,184 | B2 | 10/2020 | Greiner et al. | |
| 2004/0021946 | A1* | 2/2004 | Hoose | G02B 5/1861 359/569 |
| 2009/0290217 | A1* | 11/2009 | Hoose | G02B 6/2931 359/569 |
| 2012/0300302 | A1* | 11/2012 | Bonod | G02B 5/1861 359/569 |

(Continued)

FOREIGN PATENT DOCUMENTS

CN 111308596 A * 6/2020

OTHER PUBLICATIONS

Application No. PCT/US2021/045247, International Preliminary Report on Patentability, Mailed on Feb. 16, 2023, 7 pages.

(Continued)

*Primary Examiner* — Balram T Parbadia
*Assistant Examiner* — John Curtis Sipes
(74) *Attorney, Agent, or Firm* — KILPATRICK TOWNSEND & STOCKTON LLP

(57) ABSTRACT

An immersion grating includes a dielectric substrate having an incident light surface and a second surface opposing the incident light surface. The dielectric substrate is characterized by a substrate index of refraction. The immersion grating also includes at least one dielectric layer coupled to the second surface of the dielectric substrate. The at least one dielectric layer is characterized by a layer index of refraction greater than the substrate index of refraction. The immersion grating further includes a periodic structure formed in the at least one dielectric layer. The immersion grating is characterized by a diffraction efficiency greater than 99% over a wavelength range from 1041 nm to 1066 nm.

20 Claims, 11 Drawing Sheets

(56) References Cited

U.S. PATENT DOCUMENTS

| | | | | |
|---|---|---|---|---|
| 2015/0309220 A1* | 10/2015 | Greiner | ................ | G02B 5/1861 |
| | | | | 359/350 |
| 2017/0082863 A1* | 3/2017 | Marciante | .......... | G02B 27/1006 |
| 2018/0011334 A1* | 1/2018 | Zeitner | .............. | G02B 27/4244 |
| 2018/0031744 A1 | 2/2018 | Miller et al. | | |
| 2019/0143736 A1* | 5/2019 | Kawashita | ........... | B42D 25/351 |
| | | | | 359/567 |
| 2019/0227321 A1* | 7/2019 | Lee | .................... | G02B 27/0101 |
| 2020/0225499 A1 | 7/2020 | Marciante | | |

OTHER PUBLICATIONS

International Application No. PCT/US2021/045247 International Search Report and Written Opinion, 9 pages, mailed Nov. 1, 2021.
Marciante; et al., High-efficiency, high-dispersion diffraction gratings based on total internal reflection, Optic Letters, vol. 29, No. 6, Mar. 15, 2004, 3 pages.
Bi et al., "Design and Properties Analysis of Total Internal Reflection Gratings for Pulse Compressor at 1053 Nm", Current Applied Physics, vol. 11, No. 1, XP027332204, Jan. 1, 2011, pp. 21-27.
EP21853338.8, "Extended European Search Report", Aug. 9, 2024, 8 pages.

* cited by examiner

HIGH BANDWIDTH IMMERSION GRATING

CROSS-REFERENCES TO RELATED APPLICATIONS

This application claims the benefit of U.S. Provisional Application No. 63/062,773, filed Aug. 7, 2020, the contents of which are hereby incorporated by reference in their entirety for all purposes.

BACKGROUND OF THE INVENTION

A diffraction grating is a periodic structure that typically exists at an interface between two materials, one of which is often air. The grating generates multiple diffracted beams (called orders) when a single beam is incident upon the structure. The angular emission of the orders is given the grating equation (Equation 1) shown below $$n_i \sin(\theta_i) + n_o \sin(\theta_o) = \frac{m\lambda}{\Lambda} \qquad \text{Equation 1}$$

where $\theta_i$ is the incident angle, $n_i$ is the refractive index of the incident medium, $\theta_o$ is the output angle of a given order m, $n_o$ is the refractive index of the output medium where the light is diffracted (that can be the same as the incident medium), $\lambda$ is the optical wavelength, and $\Lambda$ is the grating period. Generally speaking, a grating can yield both transmitted orders (those that diffract from the periodic structure on the opposite side as the incident light) and reflected orders (those that diffract from the periodic structure on the same side as the incident light). While the relation of the parameters shown in Equation 1 determines which orders can exist, the physical details of the grating profile (the size and shape of the unit cell of the periodic structure) are required to calculate how much of the incident power gets diffracted into each order.

It should be noted that in relation to Equation 1, the angle of incidence and the angle of the diffracted orders are related to each other for a given wavelength and grating periodicity. The diffracted orders can either be present inside the medium or outside the medium, corresponding to the reflected and transmitted orders, respectively. Accordingly, the diffracted orders inside and outside the medium are linked by $n \sin(\theta)$. In embodiments in which the transmitted orders are suppressed, the reflected orders are governed by the total internal reflection (TIR) condition.

FIG. 1A is a simplified diagram illustrating a periodic grating that exists between air and glass. Light incident from within the glass 810 produces reflected and transmitted orders that are governed by Snell's law (Equation 1). Note that the angles in air are larger with respect to the surface normal than the angles in the glass. Note also that the m=−3 order only exists in the glass, since no transmitted angle can be produced by Equation (1) since $\sin(\theta_o)$ would be greater than unity. This is a manifestation of total internal reflection. For higher dispersion gratings, all angles within the glass can be made to be totally internally reflected, as depicted in FIG. 1B. In this way, the transmitted ordered are considered to be suppressed via total internal reflection (TIR).

Conventional diffraction gratings require a surface on which to fabricate the periodic structure. A common method for fabricating gratings is to take a substrate, for example a plate of glass, and fabricate a periodic structure upon it by etching, deposition, replication, or other of the known methods to those skilled in the art. When metal is used as a coating to provide high-efficiency diffraction from the grating, the light is incident from the air and reflectively diffracts off the metallic grating structure, never interacting with the glass substrate. This is one of the most common configurations of diffraction gratings, for example as used in spectrometers. However, it is often useful to fabricate a transmission grating wherein light incident on the grating diffracts into transmitted orders, for example in photolithography. In a transmission grating, the light must pass through the substrate either before or after being diffracted by the transmission grating.

Despite the progress made in the manufacturing and use of diffraction gratings, there is a need in the art for improved methods and systems related to diffraction gratings.

SUMMARY OF THE INVENTION

The present disclosure relates generally to methods and systems related to diffraction gratings. More particularly, embodiments of the present invention provide methods and systems for immersion gratings that are characterized by high spectral bandwidths. The immersion gratings described herein can be implemented in a prism configuration to provide an immersion grating prism. The disclosure is applicable to a variety of applications in optics and optoelectronics.

According to an embodiment of the present invention, an immersion grating is provided. The immersion grating includes a substrate having an incident light surface and an optical surface opposing the support surface. The substrate, which can be fused silica, has a refractive index greater than 1.45 over the wavelength range from 1020 nm to 1100 nm. The immersion grating also includes a diffraction grating formed in the optical surface. The diffraction grating is configured to receive light incident on the incident light surface. The immersion grating further includes an ambient environment proximal to the diffraction grating.

In an embodiment, the ambient environment is metal-free. As an example, there can be no material present between the diffraction grating formed in the optical surface and the ambient environment. The diffraction grating can be configured to diffract the received light in only the m=0 order and the m=−1 order. The diffraction grating can be a one-dimensional periodic structure, for example, a one-dimensional periodic structure that has a period≥2000 lines/mm. In some embodiments, the incident light surface and the optical surface are optical surfaces defined by flatness≤400 nm PV with surface roughness≤100 Å RMS. As an example, the refractive index of the substrate can be ≥1.8 over the wavelength range from 1020 nm to 1100 nm. The diffraction grating can be characterized by a dispersion≤1.0 radians/μm, for example, a dispersion≤0.7 radians/μm. The center of the optical spectrum can be diffracted within 5° of the Littrow condition, for example, within 3° of the Littrow condition.

According to another embodiment of the present invention, an immersion grating is provided. The immersion grating includes a dielectric substrate having an incident light surface and a second surface, which may or may not be parallel to the incident light surface, opposing the incident surface. The dielectric substrate is characterized by a substrate index of refraction. The immersion grating also includes at least one dielectric layer coupled to the second surface of the dielectric substrate. The at least one dielectric layer is characterized by a layer index of refraction greater than the substrate index of refraction. The immersion grating further includes a periodic structure formed in the at least one dielectric layer.

In an embodiment, the at least one dielectric layer is characterized by a thickness≥100 nm, for example, a thickness≥250 nm and ≤750 nm. The periodic structure can extend at least part way through the at least one dielectric layer. Alternatively, the periodic structure can extend through the at least one dielectric layer into the dielectric substrate. The periodic structure can have a period≥2000 lines/mm. The dispersion of the grating at Littrow can be ≤2.0 radians/μm, for example, ≤1.4 radians/μm. The center of the optical spectrum can be diffracted within 5° of the Littrow condition, for example, within 3° of the Littrow condition.

According to a specific embodiment of the present invention, an immersion grating prism is provided. The immersion grating prism includes a prism having an incident light surface, an optical surface, and a third surface. The prism is characterized by a prism index of refraction. The immersion grating prism also includes at least one dielectric layer coupled to the optical surface. The at least one dielectric layer is characterized by a layer index of refraction greater than the prism index of refraction. The immersion grating prism further includes a periodic structure formed in the at least one dielectric layer.

According to a particular embodiment of the present invention, a method of forming a diffracted order is provided. The method includes providing an immersion grating having a dielectric substrate having an incident light surface and a second surface opposing the incident surface. The dielectric substrate is characterized by a substrate index of refraction. The immersion grating also includes at least one dielectric layer coupled to the second surface of the dielectric substrate. The at least one dielectric layer is characterized by a layer index of refraction greater than the substrate index of refraction. The immersion grating further includes a periodic structure formed in the at least one dielectric layer.

The method also includes directing a light beam to be incident on the incident light surface of the dielectric substrate and propagating the light beam through the at least one dielectric layer. The method further includes diffracting the light beam to form a reflected order and propagating the reflected order through the at least one dielectric layer.

In an embodiment, the method also includes propagating the reflected order through the incident light surface of the dielectric substrate. The reflected order can be an m=−1 order. The method can also include disposing the immersion grating in an ambient atmosphere. The periodic structure can be a one-dimensional diffraction grating. In an embodiment, the reflected order is the only diffracted order.

Numerous benefits are achieved by way of the present disclosure over conventional techniques. For example, embodiments of the present disclosure provide high spectral bandwidth in comparison to conventional approaches. In an embodiment, a grating is formed in a high index of refraction material coupled to a substrate, enabling fabrication of an immersion grating characterized by a decreased dispersion and increased spectral bandwidth. Optical materials characterized by low optical loss, high transparency, and able to support high fluences are suitable for use in conjunction with embodiments of the present invention. These and other embodiments of the disclosure, along with many of its advantages and features, are described in more detail in conjunction with the text below and corresponding figures.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete and will fully convey the full scope to those skilled in the art.

DETAILED DESCRIPTION OF SPECIFIC EMBODIMENTS

Embodiments of the present invention relate to methods and systems related to diffraction gratings. More particularly, embodiments of the present invention provide methods and systems for immersion gratings that are characterized by high spectral bandwidths. The immersion gratings described herein can be implemented in a prism configuration to provide an immersion grating prism. The disclosure is applicable to a variety of applications in optics and optoelectronics.

Immersion gratings are a special class of grating in which light is incident upon the grating from within the substrate, typically with the intent of using the reflected diffraction orders. In this case, both the incident and desired reflected orders are contained within the substrate material. In some implementations, metal coatings are used on the air side of the grating to enhance the efficiency of reflection into the reflected orders. However, any metal coating absorbs some amount of the light incident upon it. Even for the thinnest metal layer, the absorbed optical power can be sufficient to generate undesired thermally induced changes to the grating performance or even catastrophically destroy the grating if the incident optical power is sufficiently high.

A particular type of immersion grating is made only of dielectric material and does not necessarily utilize metallic coatings, rather relying on the materials of the immersion grating, which are described by the grating equation, to disallow transmitted orders. Specifically, if the grating dispersion is sufficiently high, all transmitted orders can be suppressed. In this case, the angle of incidence associated with suppression of the transmitted orders is computed using Equation 1.

Figure 1A:
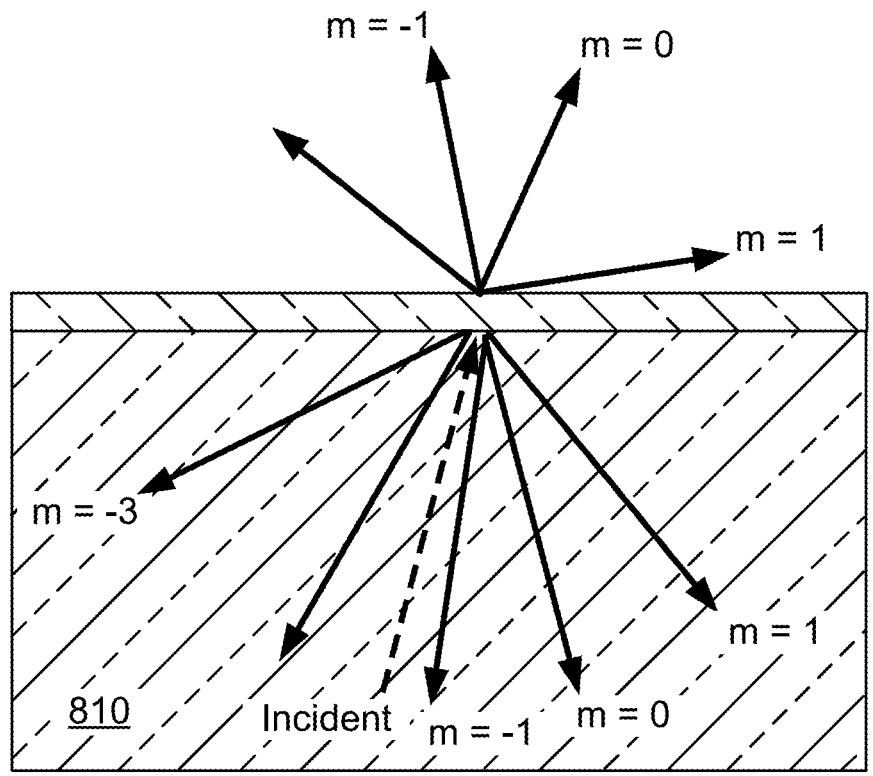
FIG. 1A is a simplified diagram illustrating a periodic grating that exists between air and glass.
Figure 1B:
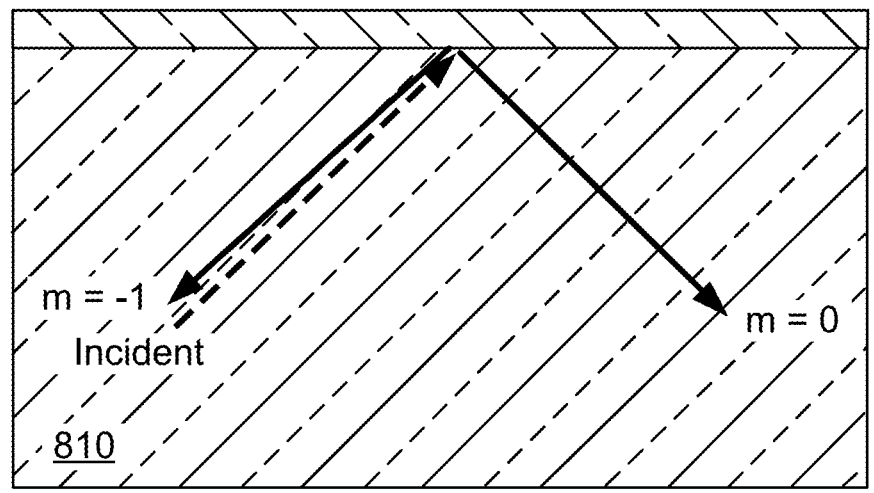
FIG. 1B is a simplified diagram illustrating total internal reflection when a grating is present.
Figure 1C:
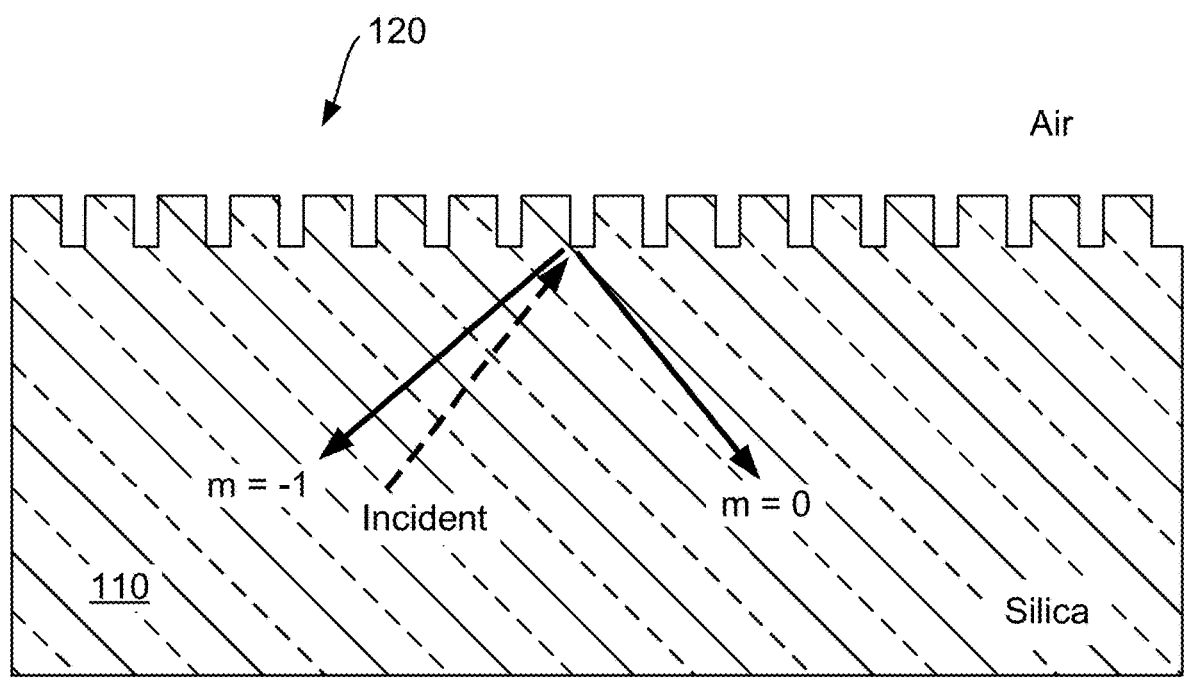
FIG. 1C is a simplified cross-sectional view of an immersion grating according to an embodiment of the present invention.

FIG. 1C is a simplified cross-sectional view of an immersion grating according to an embodiment of the present invention. For the immersion grating illustrated in FIG. 1C, the substrate medium 110 is silica glass and the grating tooth profile 120 is binary. One of skill in the art will appreciate that neither this particular substrate material nor this particular grating tooth profile are required for a reflection-only immersion grating. On the contrary, a variety of substrate materials and grating tooth profiles can be used and are included within the scope of the present invention.

Referring to FIG. 1C, some embodiments of the present invention utilize reflection-only immersion gratings having only two orders: the specular reflection (m=0 order) and the first diffracted order (m=−1). The specular order contains no spectral dispersion, as can be understood from Equation 1 by setting m=0; there is simply no wavelength dependence in this case and thus no desired spectral dispersion. In other words, the m=0 (specular) order functions as a conventional mirror. Thus, in order to exploit dispersion from the grating, one must use a diffracted order where m≠0. Optimizing the efficiency of the desired diffracted order is achieved through proper choice of the grating parameters. While this includes the grating period and incident angle in Equation 1, it also includes additional parameters of the grating tooth profile. Many grating tooth profiles can be parametrized by their shape type, for example binary, sinusoidal, or trapezoidal. In the binary grating tooth shape shown in FIG. 1C, the grating tooth profile parameters are the depth and the duty cycle. In contrast, a sinusoidal shape is only characterized by depth. A trapezoid is characterized by depth, duty cycle, and sidewall slope. One of ordinary skill in the art would recognize many variations, modifications, and alternatives.

As illustrated in FIG. 1C, the interface between the material of the immersion grating, for example, fused silica, and the ambient environment, for example, air, is metal-free. That is, the grating tooth profile 120 is not metalized, but is formed by the material of the immersion grating. Thus, the embodiment illustrated in FIG. 1C can be referred to as a metal-free grating since there is no material present between the diffraction grating formed in the optical surface and the ambient environment.

In many applications, the spectral bandwidth of high-efficiency diffraction is important. One of the challenges with implementing conventional reflection-only immersion gratings is the optical bandwidth over which high efficiency can be obtained. The dispersion of the grating needs to be sufficiently high to maintain the reflection-only conditions, and high-dispersion gratings typically have lower bandwidth, which the inventors have determined is typically applicable for immersion gratings.

Figure 2A:
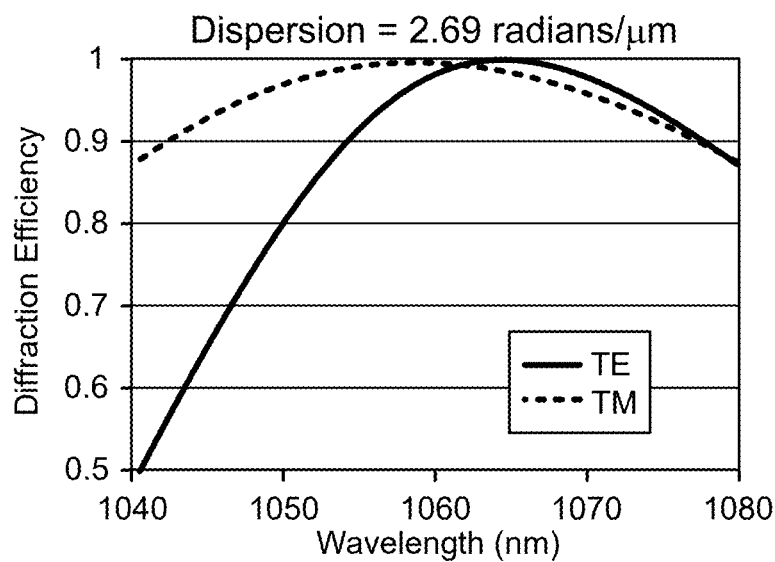
FIG. 2A is a plot of spectral diffraction efficiency for TE and TM polarizations for an immersion grating with a first dispersion.
Figure 2B:
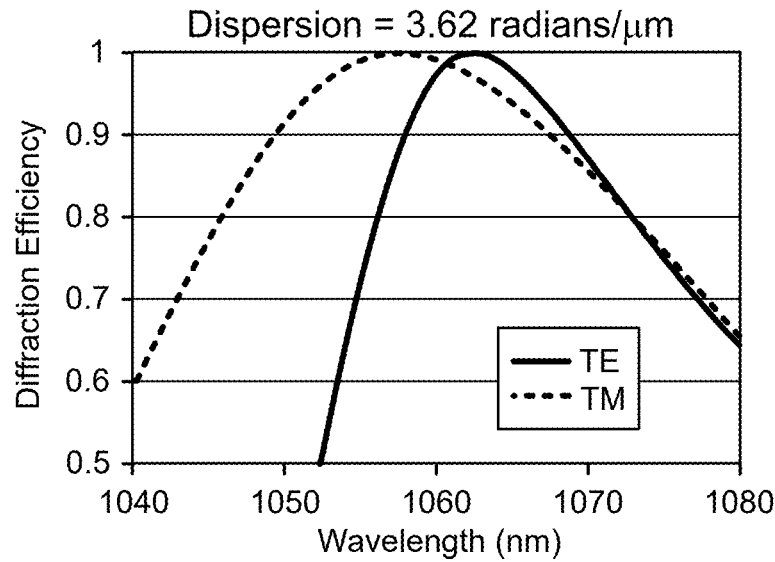
FIG. 2B is a plot of spectral diffraction efficiency for TE and TM polarizations for an immersion grating with a second dispersion.
Figure 2C:
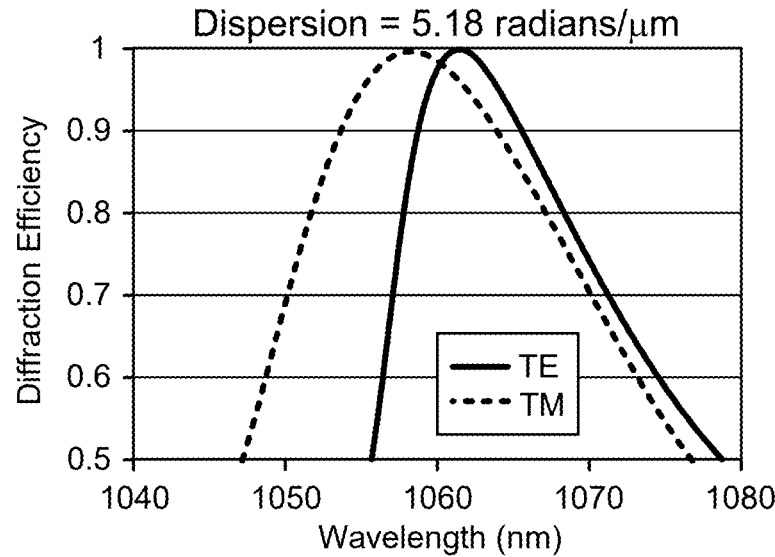
FIG. 2C is a plot of spectral diffraction efficiency for TE and TM polarizations for an immersion grating with a third dispersion.

FIG. 2A is a plot of spectral diffraction efficiency for TE and TM polarizations for an immersion grating with a first dispersion. FIG. 2B is a plot of spectral diffraction efficiency for TE and TM polarizations for an immersion grating with a second dispersion. FIG. 2C is a plot of spectral diffraction efficiency for TE and TM polarizations for an immersion grating with a third dispersion. As illustrated in FIGS. 2A-2C, the diffraction efficiency of reflection-only immersion gratings characterized by differing dispersions is plotted as a function of wavelength for both TE and TM polarizations.

As can be determined by examination of FIGS. 2A-2C, the immersion gratings are characterized by an inverse relationship between spectral bandwidth of the diffraction efficiency and dispersion, namely that the bandwidth increases as the dispersion decreases. Thus, this data would indicate that in order to maximize bandwidth, one should use the lowest dispersion possible. However, the lowest dispersion is limited by Equation 1 if high-efficiency reflection-only operation is desired. Specifically, the physics exploited to attain high-efficiency reflection-only operation places a lower limit on the usable dispersion range and therefore an upper limit on the achievable spectral bandwidth.

The dispersion, D, of a grating can be derived from Equation 1. At the Littrow condition, which is defined as the condition where the output angle of the m=−1 order is equal to the incident angle, the dispersion is defined as $$D = \frac{d\theta}{d\lambda} = \frac{2\tan\theta_L}{\lambda_c} \qquad \text{Equation 2}$$

where $\theta_L$ is the Littrow angle and $\lambda_c$ is the center wavelength of the incident optical spectrum. Although this equation is suitable for the Littrow condition in which the angle of diffraction and the angle of incidence are identical, the dispersion can be computed for other conditions in which the angle of diffraction and the angle of incidence are different.

Obtaining wider spectral bandwidth from reflection-only immersion gratings implies lower dispersion, as evidenced by FIGS. 2A-2C. For a given optical spectrum, decreasing the dispersion means decreasing the incident angle (via Equation 2) since tan(θ) is a monotonically increasing function of θ between 0 and 90 degrees.

However, one cannot simply make the angle as small as desired. The condition for reflection-only immersion gratings can be derived from Equation 1 as:

$$\frac{n_t}{n_i} < |\sin\theta_j| < 1 \qquad \text{Equation 3}$$

where $n_i$ is the refractive index of the immersion medium containing the incident and all of the reflected diffracted orders, $\theta_j$ is the incident angle or diffracted angle of all reflected diffracted orders, and $n_t$ is the refractive index of the medium outside the immersion grating where the transmitted orders are to be prohibited. In typical reflection-only immersion gratings, $n_t=1.0$ since the material used most often is air. The condition given by Equation 3 must be met by all incident and reflective diffracted orders in order to prevent transmitted orders and thus enable high-efficiency reflective diffraction.

Note that $\sin(\theta)$ is also a monotonically increasing function of $\theta$ between 0 and 90 degrees. Therefore, Equation 3 places a limit on how small the incident angle can be, which therefore places an upper limit on the attainable spectral bandwidth via Equation 2. In other words, attaining wide spectral bandwidth is physically limited by the requirements imposed to operate with high-efficiency reflection-only diffraction.

The inventors have determined that insight from analysis of Equation 3 can be used to develop a solution that provides increased optical bandwidth. Conventional free-space optical systems that utilize immersion gratings typically use a substrate of glass, which has a refractive index in the range of 1.44-1.58. However, the inventors have determined that the dispersion can be reduced if the immersion material (i.e., the material in which the incident light is propagating) has an increased refractive index.

Figure 3A:
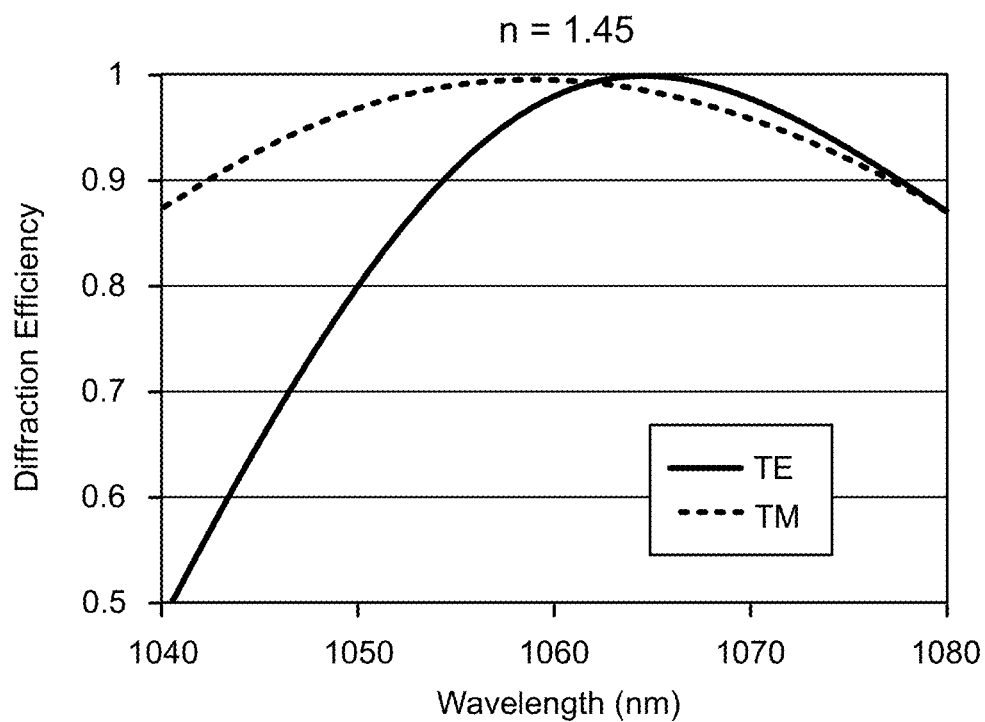
FIG. 3A is a plot illustrating spectral diffraction efficiency for an immersion grating using a substrate having a first index of refraction.
Figure 3B:
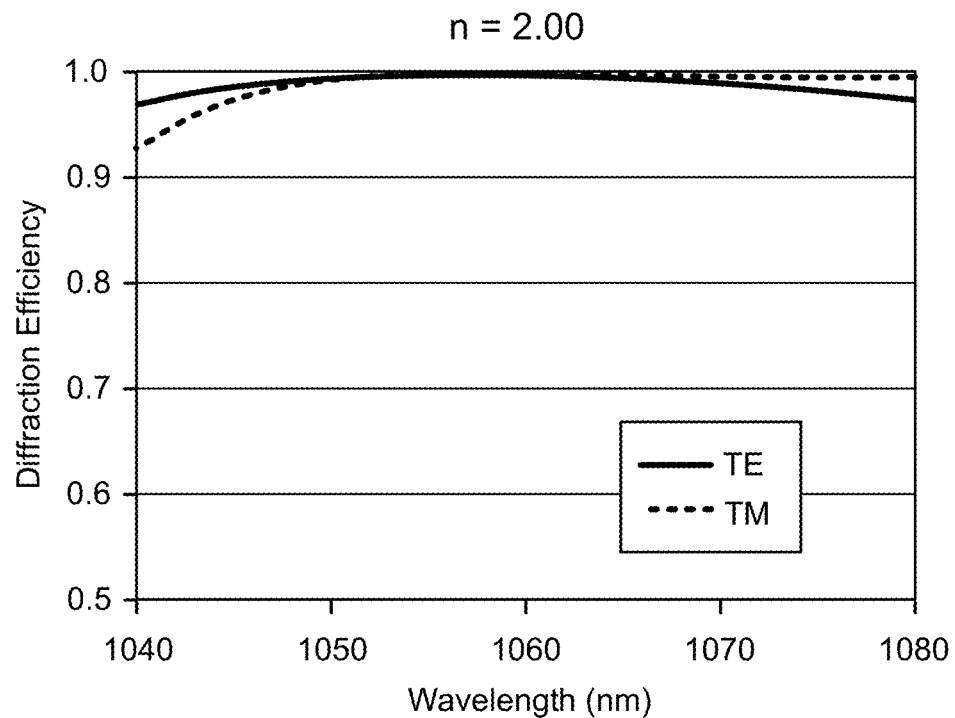
FIG. 3B is a plot illustrating spectral diffraction efficiency for an immersion grating using a substrate having a second index of refraction.

FIG. 3A is a plot illustrating spectral diffraction efficiency for an immersion grating using a substrate having a first index of refraction. FIG. 3B is a plot illustrating spectral diffraction efficiency for an immersion grating using a substrate having a second index of refraction. In FIGS. 3A and 3B, the diffraction efficiency of reflection-only immersion gratings is plotted as a function of wavelength for both TE and TM polarizations. For these immersion gratings, the substrate in which the diffractive elements (e.g., diffraction grating lines) are formed is characterized by an index of refraction. The dispersion for the immersion gratings corresponding to the plots in FIGS. 3A and 3B was equal to 2.7 radians/μm and 1.2 radians/μm, respectively.

FIG. 3A is a plot corresponding to an immersion grating in which the substrate has an index of refraction, n=1.45 (similar to a fused silica glass), and FIG. 3B is a plot corresponding to an immersion grating in which the substrate has an index of refraction, n=2.00. The index of refraction of n=1.45 is characteristic of the immersion grating over a wavelength range from 1040 nm to 1080 nm, over a wavelength range from 1030 nm to 1090 nm, or over a wavelength range from 1020 nm to 1100 nm. These plots show that increasing the refractive index of the substrate produces, for a constant grating periodicity, an increase in dispersion and, thus, a wider spectral bandwidth. Thus, for a substrate with an index of refraction of 1.45 a dispersion of 2.7 radians/μm results, producing a polarization averaged spectral bandwidth of only 12 nm for high efficiency above 98%. As the substrate index is increased to an index of refraction of 2.00, the dispersion decreases to 1.2 radians/μm and the polarization averaged spectral bandwidth increases to 36 nm.

Because the critical angle for TIR decreases with increasing substrate index of refraction (given a substrate/air interface), the increase in the ratio of the substrate/air indices of refraction results in a TIR angle that is smaller. Broader bandwidth results from using the smaller incident angles allowed by the smaller TIR angle. This, therefore, represents a lower dispersion grating, as determined by Equation (2).

Although FIG. 3B indicates that an increase in the index of refraction of the substrate used for the immersion grating will increase the spectral bandwidth, higher-index materials are not always readily available with the correct optical properties. For example, higher-index bulk materials may not have high optical quality, such that beams that pass through them become aberrated. Moreover, higher-index bulk materials may not have sufficiently low absorption, such that beams that pass through them lose power and generate thermal aberrations. As an example, although silicon has low absorption in the telecommunications band (1550 nm), and, therefore, could be a suitable candidate for the substrate material for an immersion grating, it cannot be used in visible or IR (1000 nm) bands due to extremely high absorption at these optical wavelengths. Moreover, while thin layers of silicon are of high optical quality, immersion gratings typically require a substantial amount of bulk material (thicknesses in the range of 1-10 mm) for the immersion substrate. Such bulk material may not have sufficient optical quality for free-space beam propagation.

These requirements are stringent in reflection-only immersion gratings since they require indirect optical entry into the substrate medium through an interface that is not parallel to the grating surface. This can be understood by analyzing Equation 3: any incident angle that satisfies Equation 3 can have no transmission through to the air. One skilled in the art recognizes that the reverse is also true: no beam incident from the air can be transmitted into the medium through the interface or a surface parallel to the interface. For this reason, reflection-only immersion gratings are often formed on the surface of a prism, thereby allowing light to enter into one side of the prism, and diffract via the grating that is formed on another side of the prism. The fact that the incident light travels through a significant amount of material significantly limits the number of materials that can be used to increase the spectral bandwidth of the immersion grating by increasing the refractive index of the grating material used for the substrate of the immersion grating.

Figure 4:
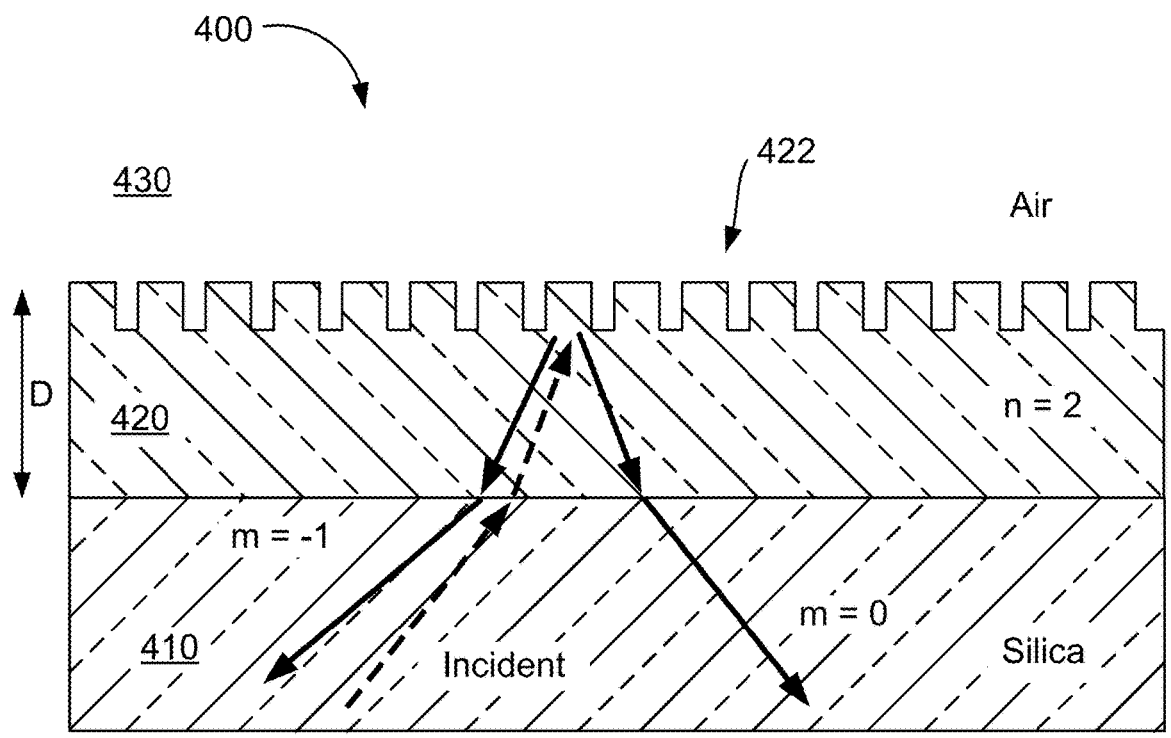
FIG. 4 is a simplified cross-sectional view illustrating an immersion grating according to an embodiment of the present invention.

FIG. 4 is a simplified cross-sectional view illustrating an immersion grating according to an embodiment of the present invention. In the immersion grating 400 illustrated in FIG. 4, substrate 410 supports dielectric layer 420 in which grating tooth profile 422 is formed. The immersion grating is surrounded on one or more sides by an ambient environment 430, which is illustrated in FIG. 4 by air. This ambient environment, which can be referred to as a cover layer, provides a lower index of refraction than the dielectric layer and can be air, resulting in a dielectric/air interface at the grating tooth profile, or other materials, including low index solid materials, as described more fully herein.

As illustrated in FIG. 4, substrate 410 utilizes a material that is characterized by low optical loss and high optical quality to support propagation of the incident beam. As an example, substrate 410 can be fabricated using fused silica, borosilicate glass, multi-component silicate glass, or other materials characterized by high optical quality at the wavelengths of interest. As discussed above, the design of the parameters of the immersion grating is such that only orders m=0 and m=−1 are allowed, resulting in a prohibited transmission zone in ambient atmosphere 430. Accordingly, immersion grating 400 only produces a specular reflection order (m=0) and a single diffracted order (m=−1) for the illustrated incident angle. Thus, in some embodiments, the dispersion is selected (e.g., at a low level) such that only a single order (i.e., m=−1) is supported by the immersion grating and the m=+1 order, as well as the m=−2 orders are not produced by the immersion grating. Although FIG. 4 illustrates the use of a single order (i.e., m=−1), the present invention is not limited to the use of a single order and other embodiments can use a greater number of orders, including the use of higher orders, for example, the m=−2 order. As an example, in some embodiments utilizing the m=−2 order, the m=−1 order can be suppressed. One of ordinary skill in the art would recognize many variations, modifications, and alternatives.

As will be evident to one of skill in the art, the reduced number of orders supported by the immersion grating enables the use of grating design techniques that preferentially direct light into one of the reduced number of orders. As an example, referring to FIG. 4, since there are only two orders supported by the immersion grating, the grating parameters, including depth, duty cycle, and the like, can be utilized to diffract a majority of the power present in the diffracted light into the m=−1 order, with less power present in the m=0 order. As an example, grating tooth profile 422 can be designed such that 90% or more of the diffracted power can be present in the m=−1 order. In other embodiments, the percentage of the diffracted power in the m=−1 order can be greater than 91%, greater than 92%, greater than 93%, greater than 94%, greater than 95%, greater than 96%, greater than 97%, greater than 98%, or greater than 99%.

In order to provide a high index material at the immersion grating/air interface illustrated in FIG. 4, dielectric layer 420 is characterized by high optical quality and a higher index of refraction than substrate 410. Thus, embodiments of the present invention utilize a high index of refraction disposed between substrate 410 and the ambient environment surrounding immersion grating 400. As examples, dielectric layer 420 can be fabricated using tantalum pentoxide, hafnium oxide, scandium oxide, titania oxide, and other materials characterized by refractive index greater than the substrate at the wavelengths of interest and can have a thickness D ranging from 50-1,000 nm. At a wavelength range of 1052 nm, the index of refraction of tantalum pentoxide is ~2.1 and the index of refraction of hafnium oxide is ~2.1. In the embodiment illustrated in FIG. 4, the ambient environment is air. As illustrated in FIG. 4, the higher index materials utilized in dielectric layer 420 bend the incident rays closer to normal incidence (via Snell's law) allowing the grating to be interrogated at a lower angle of incidence. As discussed in relation to Equation 2, the lower angle of incidence decreases the dispersion of the immersion grating. In turn, as discussed in relation to FIGS. 2A-2C, the decrease in dispersion results in an increase in spectral bandwidth.

Thus, embodiments of the present invention lower-dispersion immersion gratings are enabled through the use of a high index of refraction material in the form of dielectric layer 420, while retaining the low-loss properties inherent in the material utilized for substrate 410 through which the incident and diffracted light propagates. It should be noted that although FIG. 4 illustrates a binary grating of a predetermined depth and period and a dielectric layer with an index of refraction of 2.0, embodiments of the present invention are not limited to this illustrated example. In fact, embodiments of the present invention are not limited by any particular requirements on the grating tooth profile or depth, index of refraction for dielectric layer 420, thickness of dielectric layer 420, or the like. One of ordinary skill in the art would recognize that designs for a particular grating tooth profile and/or dielectric layer 420 can be optimized for efficiency, bandwidth, or the like.

It should be noted that the angle at which the m=−1 order is diffracted is the same in the substrate, whether the diffraction results from the substrate/air interface as illustrated in FIG. 1C or the dielectric layer/air interface as illustrated in FIG. 4. This same substrate diffraction angle, for a given grating periodicity, results from the refraction of light at the substrate/dielectric layer interface and the resulting decrease in angle of incidence at the dielectric layer/air interface. One of ordinary skill in the art would recognize many variations, modifications, and alternatives.

Although a single dielectric layer 420 is illustrated in FIG. 4, embodiments of the present invention are not limited to a single layer. In other embodiments, multiple dielectric layers are coupled to substrate 410, with the index of refraction of each layer increasing with distance from the substrate. As an example, a first dielectric proximal to the substrate and having an index of refraction of 1.8 could be utilized with a second dielectric layer distal to the substrate and having an index of refraction of 2.1. In this example, the grating tooth profile would then be formed in the second dielectric layer. More than two dielectric layers can be coupled to the substrate. Although embodiments are described herein in relation to layers, it will be appreciated that the term layer can include sub-layers, graded composition layers, and the like. One of ordinary skill in the art would recognize many variations, modifications, and alternatives. Moreover, although a grating tooth profile having a binary profile with no blazing is illustrated, it will be appreciated that any suitable grating profile can be utilized including multi-level gratings, sinusoidal gratings, saw tooth gratings, trapezoidal gratings, blazed gratings, nano-structures, meta-surfaces, and the like. A benefit provided by the binary grating that are illustrated in FIG. 4 (and some other grating geometries) is that the depth of the grating teeth can be modified independent of the period (i.e., duty cycle) of the grating. As will be evident to one of skill in the art, binary gratings characterized by non-vertical grating teeth resulting from the manufacturing process are included within the scope of the present invention.

Figure 5A:
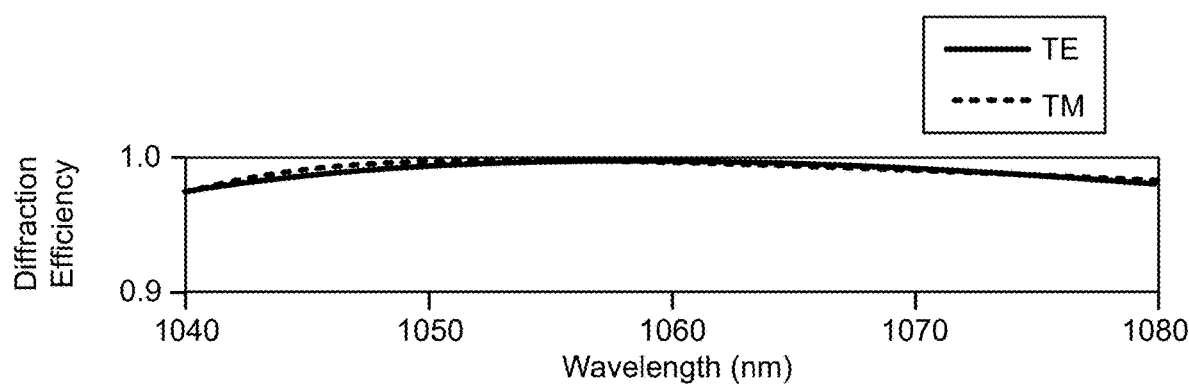
FIG. 5A is a plot illustrating spectral diffraction efficiency for the immersion grating illustrated in FIG. 4.

FIG. 5A is a plot illustrating spectral diffraction efficiency for the immersion grating illustrated in FIG. 4. Although FIG. 5A presents data for one particular configuration of parameters for the immersion grating shown in FIG. 4, it will be appreciated that variations of the immersion grating parameters may result in changes in the plot illustrated in FIG. 5A.

Referring to FIG. 5A, the high diffraction efficiency for both TE and TM modes is substantially equal over the wavelength range of 1040 nm to 1080 nm illustrated in the figure. In particular, the diffraction efficiency for both TE and TM modes is greater than 99% over a wavelength range from 1040 nm to 1080 nm. Although FIG. 5A illustrates the wavelength range from 1040 nm to 1080 nm, embodiments of the present invention are applicable to a wavelength range from 1030 nm to 1090 nm as well as a wavelength range from 1020 nm to 1100 nm. Moreover, although infrared wavelengths are illustrated in FIG. 5A, the present invention is not limited to infrared wavelengths and embodiments of the present invention are suitable for use over a broad wavelength range covering ultraviolet to infrared wavelengths, including visible wavelengths. In comparison with FIG. 3A, which is a plot illustrating spectral diffraction efficiency for an immersion grating using a substrate having a similar index of refraction, n=1.45, to substrate 410 fabricated using silica glass (i.e., fused silica), the use of a high index material as dielectric layer 420 at the immersion grating/air interface as illustrated in FIG. 4, results in a greatly improved spectral bandwidth since the diffraction efficiency is increased at many of the wavelengths between 1040 nm and 1080 nm. It should also be noted that although the light is incident on substrate 410 (e.g., silica glass with an index of refraction of n=1.45), the spectral bandwidth is nearly as wide as the bulk material with refractive index n=2.00 to which the plot shown in FIG. 3B corresponds. In high power laser applications, high diffraction efficiency (i.e., diffraction efficiency greater than 99% at the operating wavelength) enables operation that would not be possible if the diffraction efficiency were lower (i.e., diffraction efficiency less than 99%). In some embodiments, the high efficiency (i.e., diffraction efficiency for both TE and TM modes greater than 98%) is present over a wavelength range from 1040 to 1080 nm, for example, from 1041 to 1066 nm.

Not only is the diffraction efficiency important in high power laser applications, but the transparency of the materials utilized in the immersion grating enables high power operation without damage to optical components.

Comparing FIG. 1C and FIG. 4, the same substrate and grating parameters are utilized, with the immersion grating illustrated in FIG. 4 incorporating high refractive index dielectric layer 420. Comparing the dispersion of 2.7 radians/μm corresponding to FIG. 3A to the dispersion of 1.2 radians/μm corresponding to FIG. 5A, the addition of the high index dielectric layer in which the grating is formed increased the polarization averaged 98% efficiency spectral bandwidth from 12 nm in FIG. 3A 44 nm in FIG. 5A. Thus, by increasing the index of refraction at the grating/ambient environment interface, although the majority of the optical element is unchanged, decreases in the dispersion and increases in the spectral bandwidth are achieved.

Although FIG. 5A demonstrates the increased spectral bandwidth provided by embodiments of the present invention in comparison with conventional approaches, this particular data is not intended to limit the scope of the present invention. Rather, the increased spectral bandwidth illustrated in FIG. 5A indicates that structures provided according to embodiments of the present invention will provide benefits similar to those shown in FIG. 5A and FIG. 5A is merely exemplary of the increased spectral bandwidth that can be achieved by embodiments of the present invention.

In some of the figures and description provided herein, the ambient environment in which the immersion grating is disposed is air (see, for example, FIG. 4). However, embodiments of the present invention are not limited by this particular ambient atmosphere, which is utilized merely in an exemplary manner. Other gases that can be used as the ambient atmosphere include vacuum and/or alternate gases such as inert gases, nitrogen, argon or other noble gases, lower-refractive index materials such as low index polymer, aerogels, or low index liquids such as water, and the like can be used in accordance with Equation 3. Thus, the ambient environment is not limited to gases and can include solids as appropriate. One of ordinary skill in the art would recognize many variations, modifications, and alternatives.

Figure 5B:
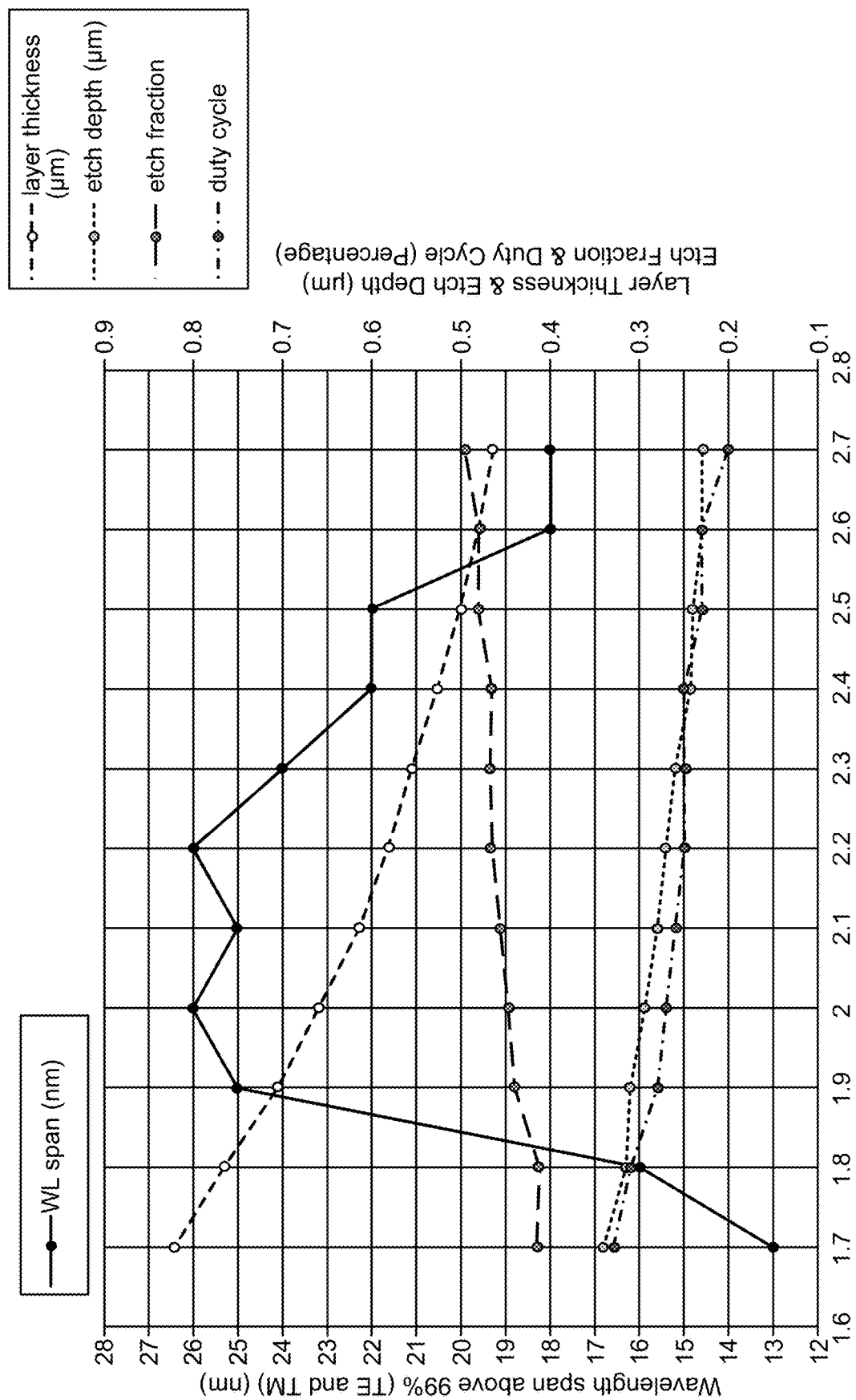
FIG. 5B is a plot illustrating grating characteristics for immersion gratings with dielectric layers having differing indices of refraction according to an embodiment of the present invention.

FIG. 5B is a plot illustrating grating characteristics for immersion gratings with dielectric layers having differing indices of refraction according to an embodiment of the present invention. As illustrated in FIG. 5B, the wavelength span over which the diffraction efficiency is greater than 99% (in nanometers) is plotted on the left ordinate axis as a function of the index of refraction of the dielectric layer 420 illustrated in FIG. 4. The diffraction efficiency is computed as the lower value of the diffraction efficiency in the TE mode and the diffraction efficiency in the TM mode. The wavelength span is only plotted at index of refraction values incremented by 0.1, but would likely result in a smooth curve if plotted at a finer increment. One of ordinary skill in the art would recognize many variations, modifications, and alternatives.

Referring to FIG. 4 and as shown in FIG. 5B, for an immersion grating with a dielectric layer 420 having an index of refraction of 1.7, the wavelength span over which the diffraction efficiency is greater than 99% is only 13 nm. As the index of refraction of the dielectric layer is increased to 1.9, the bandwidth associated with a diffraction efficiency greater than 99% increases significantly, resulting in a wavelength range of 25 nm-26 nm, approximately twice the bandwidth associated with the immersion grating with a dielectric layer having an index of refraction of 1.7. For a range of index of refraction values between 1.9 and 2.2, the diffraction efficiency remains at this high level, providing a wavelength range of 25 nm-26 nm at which the diffraction efficiency exceeds 99%. As a result, immersion gratings with these high diffraction efficiencies are applicable in a variety of high power laser applications.

Referring once again to FIG. 5B, as the index of refraction of the of the dielectric layer is increased further to 2.6, the wavelength span over which the diffraction efficiency is greater than 99% decreases, dropping to a wavelength range of 18 nm for an index of refraction of 2.6. Thus, the inventors have determined that a narrow range of indices of refraction are associated with high diffraction efficiencies (i.e., >99%), specifically, the plateau of large wavelength spans for immersion gratings with a dielectric layer having an index of refraction between 1.9 and 2.2.

In addition to variation in the wavelength span over which high diffraction efficiency is achieved as a function of dielectric layer index of refraction, other parameters of the immersion grating vary with the dielectric layer index of refraction. As shown on the right ordinate axis, the thickness of dielectric layer 420, referred to as the layer thickness (in μm) as well as the etch depth associated with the gratings defined in the dielectric layer, also measured in microns, vary with the index of refraction. The layer thickness varies from ~0.8 μm for an index of refraction of 1.7 to ~0.45 μm for an index of refraction of 2.6. Similarly, the etch depth of the periodic structure defining the gratings varies from ~0.35 μm of an index of refraction of 1.7 to ~0.25 for an index of refraction of 2.6. Thus, to achieve an index of refraction of 1.9, a layer thickness of ~0.7 μm and an etch depth of ~0.3 μm can be utilized. To achieve an index of refraction of 2.2, a layer thickness of ~0.58 μm and an etch depth of ~0.27 μm can be utilized. Indices of refraction between 1.9 and 2.2 can be achieved by using layer thicknesses and etch depths between these values.

In addition to the layer thickness and etch depth, the right ordinate axis is used to represent the portion of the dielectric layer etched to form the grating, referred to as the etch fraction, and the duty cycle of the grating, both measured as a percentage. The etch fraction varies from ~40% for an index of refraction of 1.7 to ~50% μm for an index of refraction of 2.6. Similarly, the duty cycle varies from ~0.35 µm of an index of refraction of 1.7 to ~0.2 for an index of refraction of 2.6. Thus, to achieve an index of refraction of 1.9, an etch fraction of ~45% and a duty cycle of ~27% µm can be utilized. To achieve an index of refraction of 2.2, an etch fraction of ~46% µm and a duty cycle of ~25% µm can be utilized. Indices of refraction between 1.9 and 2.2 can be achieved by using etch fractions and duty cycles between these values.

Figure 5C:
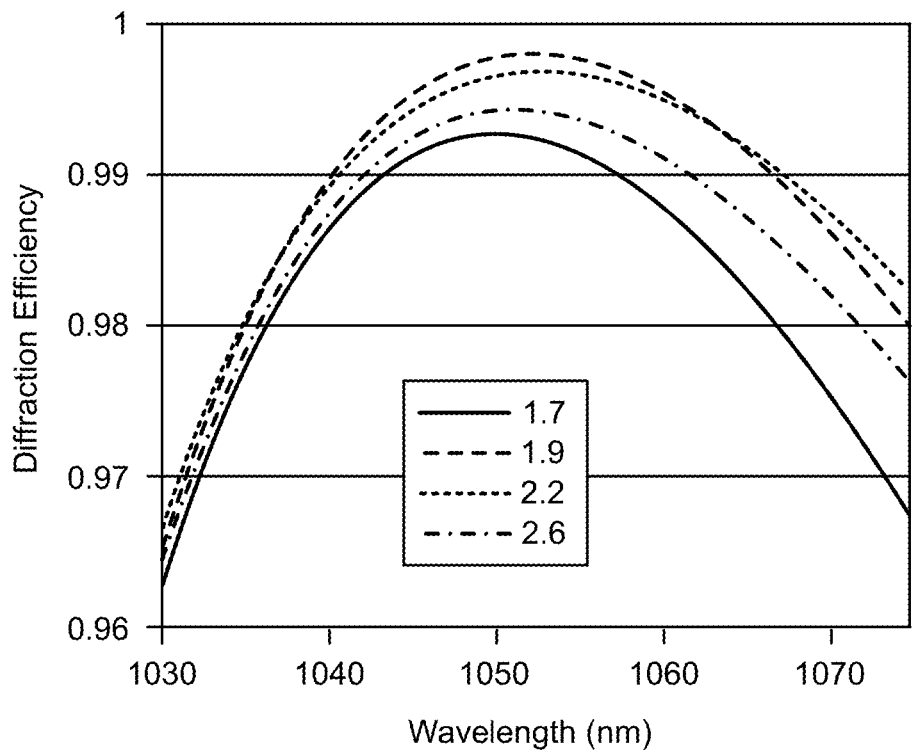
FIG. 5C is a plot illustrating spectral diffraction efficiency for immersion gratings with dielectric layers having differing indices of refraction according to an embodiment of the present invention.

FIG. 5C is a plot illustrating spectral diffraction efficiency for immersion gratings with dielectric layers having differing indices of refraction according to an embodiment of the present invention. In FIG. 5C, the diffraction efficiencies for immersion gratings similar to that shown in FIG. 4 are plotted for immersion gratings with a dielectric layer 420 having an index of refraction of 1.7, 1.9, 2.2, and 2.6, respectively. As shown in FIG. 5C, using a dielectric layer 420 having an index of refraction of 1.7, the diffraction efficiency exceeds 99% over a narrow wavelength range of ~13 nm. As the index of refraction of the dielectric layer is increased to 1.9 and 2.2, the bandwidth associated with diffraction efficiencies greater than 99% increases significantly, resulting in a wavelength range of ~25 nm, approximately twice the bandwidth associated with the immersion grating with a dielectric layer having an index of refraction of 1.7. As the index of refraction of the dielectric layer is increased further to 2.6, the bandwidth decreases to ~18 nm. Thus, as discussed in relation to FIG. 5B, a narrow range of indices of refraction are associated with high diffraction efficiencies (i.e., >99%).

Referring to FIG. 5C, for immersion gratings with a dielectric layer having an index of refraction of 1.7, the diffraction efficiency ranges from ~96% at 1030 nm, only reaching ~98.5% at 1040 nm, to ~96% at 1075 nm. For this particular immersion grating, the narrow range of diffraction efficiencies greater than 99% results in the diffraction efficiency being less than 99% over most of the range between 1030 nm and 1075 nm. The low efficiency associated with the dielectric layer having an index of refraction of 1.7 results in poor performance in high power laser applications.

Figure 5D:
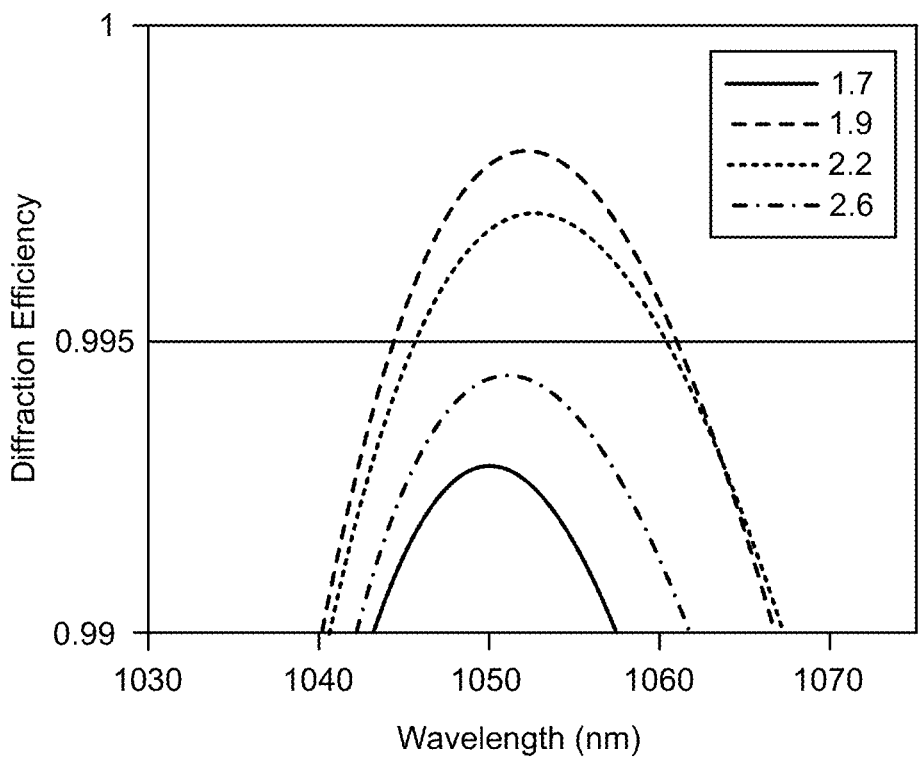
FIG. 5D is a plot illustrating spectral diffraction efficiencies higher than 99% for the immersion gratings illustrated in FIG. 5C.

FIG. 5D is a plot illustrating spectral diffraction efficiencies higher than 99% for the immersion gratings illustrated in FIG. 5C. In FIG. 5D, the same data presented in FIG. 5C is shown, but over a narrower diffraction efficiency range from 99% to 1.0. As illustrated in FIG. 5D, for immersion gratings with a dielectric layer having an index of refraction of 1.9 and 2.2, the diffraction efficiency exceeds 99% over a wavelength range from ~1040 nm to ~1065 nm.

Figure 5E:
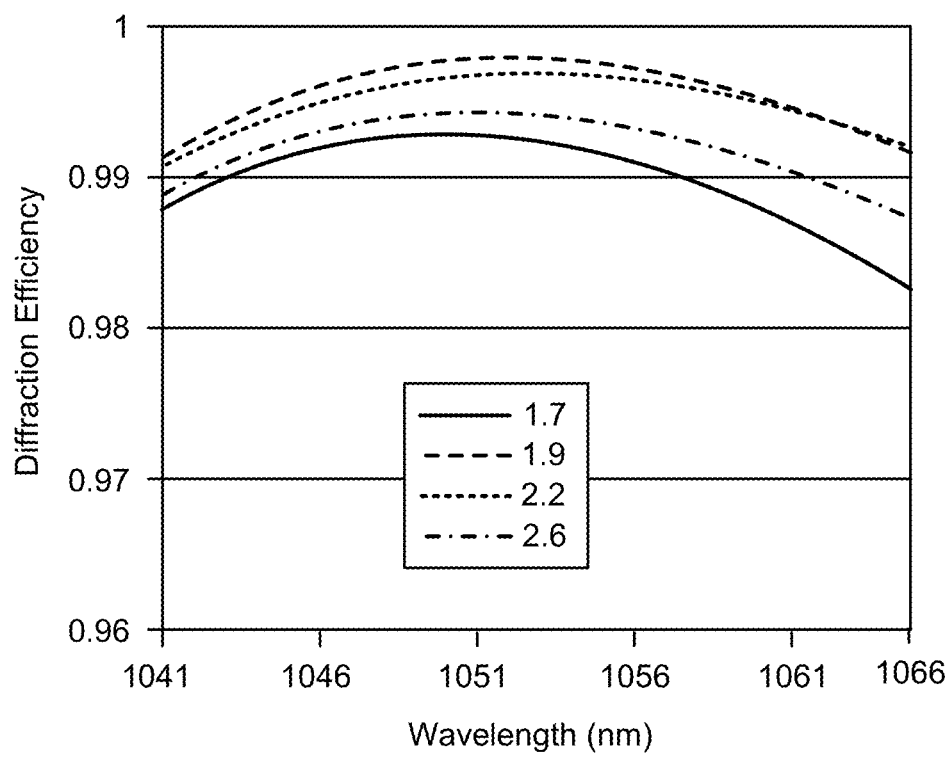
FIG. 5E is a plot illustrating spectral diffraction efficiency for immersion gratings with dielectric layers having differing indices of refraction over a limited wavelength range according to an embodiment of the present invention.

FIG. 5E is a plot illustrating spectral diffraction efficiency immersion gratings with dielectric layers having differing indices of refraction over a limited wavelength range according to an embodiment of the present invention. In comparison with FIG. 5C, which covered a wavelength range from 1030 nm to 1075 nm, FIG. 5E only covers a wavelength range from 1041 to 1065 nm, enabling additional analysis of the spectral characteristics of the diffraction efficiency. In FIG. 5E, the diffraction efficiencies for immersion gratings similar to that shown in FIG. 4 are plotted for immersion gratings with a dielectric layer 420 having an index of refraction of 1.7, 1.9, 2.2, and 2.6, respectively. As shown in FIG. 5E, using a dielectric layer 420 having an index of refraction of 1.7, the diffraction efficiency exceeds 99% over a narrow wavelength range of ~13 nm extending from ~1044 nm to 1057 nm. As the index of refraction of the dielectric layer is increased to 1.9 and 2.2, the bandwidth associated with diffraction efficiencies greater than 99% increases significantly, resulting in a wavelength range of ~25 nm extending substantially over the entire plotted range from 1041 nm to 1066 nm, approximately twice the bandwidth associated with the immersion grating with a dielectric layer having an index of refraction of 1.7. As the index of refraction of the dielectric layer is increased further to 2.6, the bandwidth decreases to ~18 nm extending from ~1043 nm to 1061.

Figure 5F:
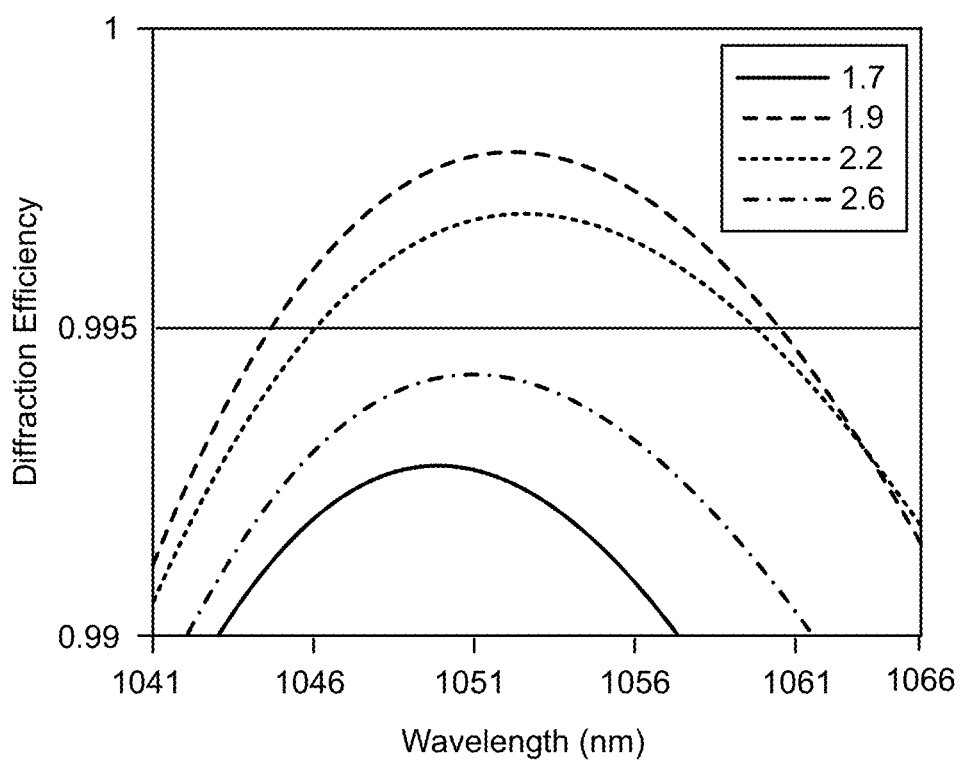
FIG. 5F is a plot illustrating spectral diffraction efficiencies higher than 99% for the immersion gratings illustrated in FIG. 5E.

FIG. 5F is a plot illustrating spectral diffraction efficiencies higher than 99% for the immersion gratings illustrated in FIG. 5E. In FIG. 5F, the same data presented in FIG. 5E is shown, but over a narrower diffraction efficiency range from 99% to 100%. As illustrated in FIG. 5F, for immersion gratings with a dielectric layer having an index of refraction of 1.9 and 2.2, the diffraction efficiency exceeds 99% over a wavelength range from ~1041 nm to ~1066 nm.

Thus, the inventors have determined that immersion gratings based on the design illustrated in FIG. 4 and utilizing materials for dielectric layer 420 having an index of refraction between 1.9 and 2.2 provide high diffraction efficiency (i.e., diffraction efficiency greater than 99%) over the wavelength range of 1041 nm to 1066 nm.

The inventors have determined that the high index associated with the dielectric layer, for example, using hafnium oxide or tantalum pentoxide, in the range of 1 µm, i.e., between 1041 nm and 1066 nm, coupled with the low absorption of the dielectric layer, for example, using hafnium oxide or tantalum pentoxide, in the range of 1 µm, i.e., between 1041 nm and 1066 nm, enables both high diffraction efficiency and low loss, which are important for high power laser applications.

Figure 6:
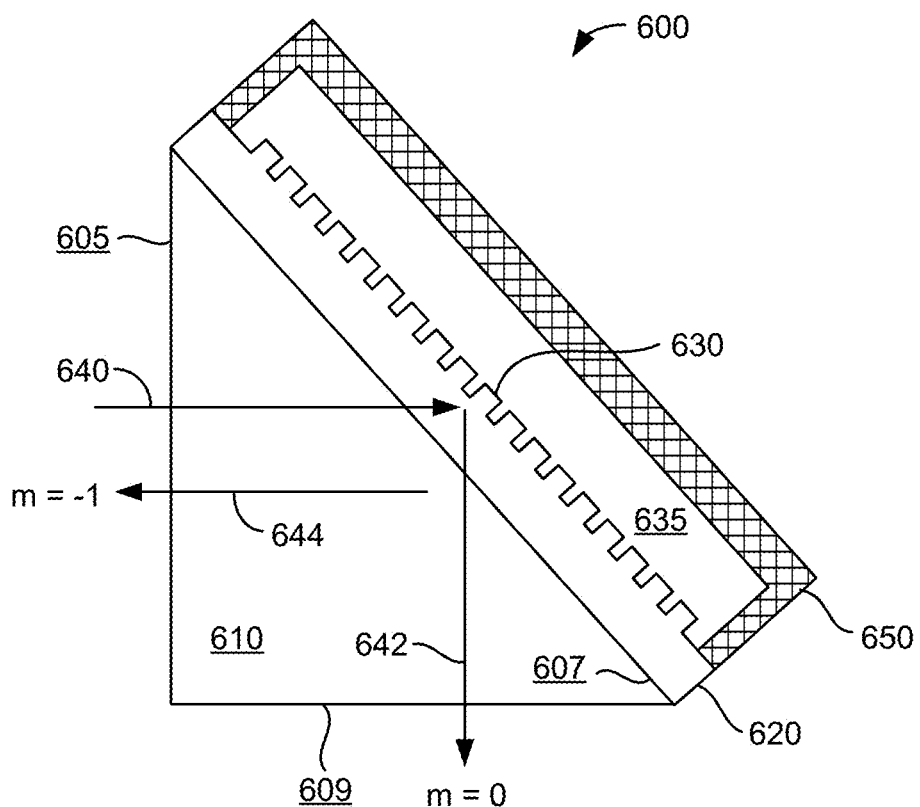
FIG. 6 is a simplified cross-sectional view illustrating an immersion grating prism according to an embodiment of the present invention.

FIG. 6 is a simplified cross-sectional view illustrating an immersion grating prism 600 according to an embodiment of the present invention. As illustrated in FIG. 6, incident light beam 640 is incident on incident light surface 605 of a prism 610 that includes incident light surface 605, an optical surface 607, and a third surface 609. The prism is characterized by a prism index of refraction. Incident light beam 640 passes through incident light surface 605 and propagates toward optical surface 607. At least one dielectric layer 620 is coupled to the optical surface 607. As discussed in relation to FIG. 4, the at least one dielectric layer 620 is characterized by a layer index of refraction greater than the prism index of refraction.

As illustrated in FIG. 6, a periodic structure 630 is formed in the at least one dielectric layer 620. The periodic structure 630 defines the interface between the at least one dielectric layer 620 and ambient environment 635. As discussed in relation to FIG. 4, the periodic structure, for example, a diffraction grating, diffracts light in the incident light beam 640 into the m=0 order 642, which propagates through third surface 609, and the m=−1 order 644, which is diffracted to propagate through incident light surface 640. Thus, both the incident light beam and the reflected order (i.e., the m=−1 order 644) pass through incident light surface 605, with the incident light beam passing through the incident light surface as the incident light enters the prism and the reflected order (i.e., the m=−1 order 644) passing through the incident light surface as the reflected order exits the prism. In the embodiment illustrated in FIG. 6, a cover 650 is provided to enclose the ambient environment 635, for example, to form a hermetic seal. In other embodiments, cover 650 is optional.

As will be evident to one of skill in the art, immersion grating prism 600 shares common elements with immersion grating 400 illustrated in FIG. 4 and the description provided in relation to FIG. 4 is applicable to immersion grating prism 600 as appropriate. One of ordinary skill in the art would recognize many variations, modifications, and alternatives.

Utilizing the immersion grating illustrated in FIG. 6, a collimated input beam represented by input beam 640 is reflected in the m=0 order as illustrated by reflected beam 642. A single diffracted order (i.e., the m=−1 order) is diffracted as represented by diffracted beam 644. In some embodiments, input beam 640 is near the Littrow condition (e.g., within 5 degrees of Littrow or within 3 degree of Littrow) such that the m=−1 order diffracted beam 644 is substantially parallel to input beam 640 (e.g., within 5 degrees of parallel or within 3 degrees of parallel).

Figure 7:
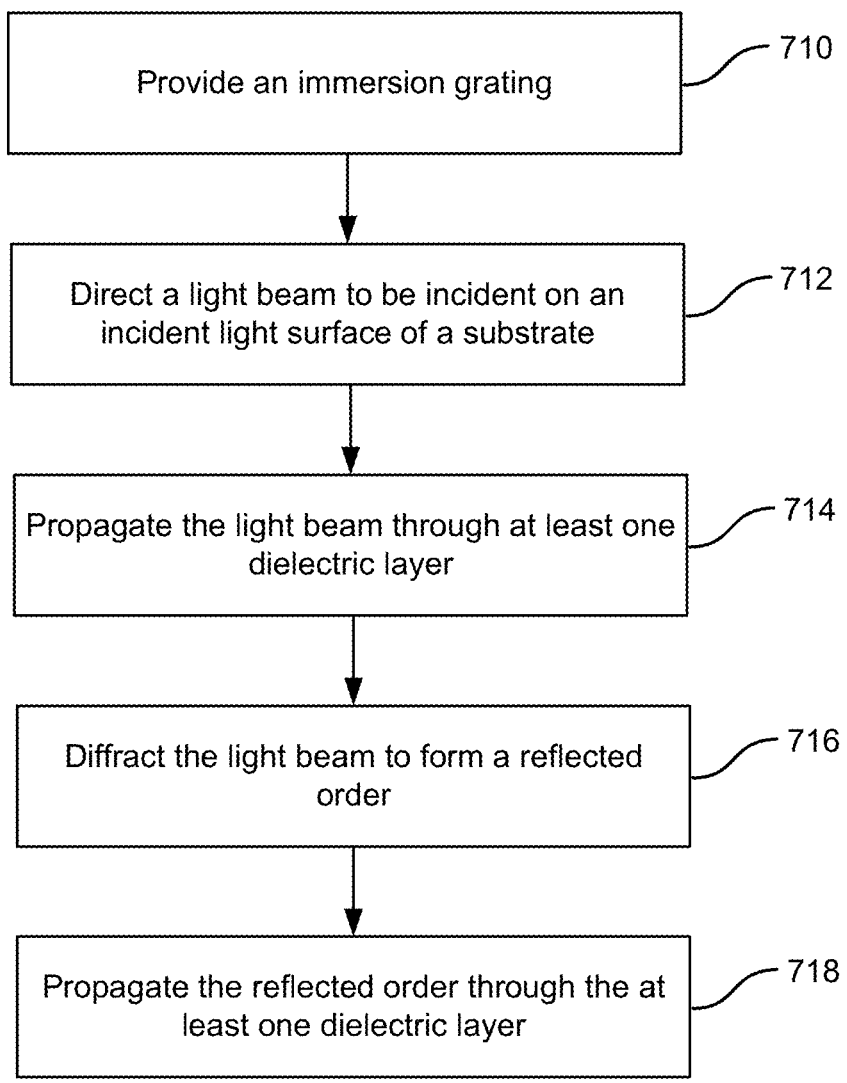
FIG. 7 is a simplified flowchart illustrating a method of operating an immersion grating according to an embodiment of the present invention.

FIG. 7 is a simplified flowchart illustrating a method of operating an immersion grating according to an embodiment of the present invention. The method 700 forms a diffractive order and includes providing an immersion grating having a dielectric substrate having an incident light surface and a second surface opposing the incident surface (710). The dielectric substrate is characterized by a substrate index of refraction. The immersion grating also includes at least one dielectric layer coupled to the second surface of the dielectric substrate. The at least one dielectric layer is characterized by a layer index of refraction greater than the substrate index of refraction. The immersion grating further includes a periodic structure formed in the at least one dielectric layer. The periodic structure can be formed as a one-dimensional diffraction grating.

The method also includes directing a light beam to be incident on the incident light surface of the dielectric substrate (712) and propagating the light beam through the at least one dielectric layer (714). In the embodiment illustrated in FIG. 4, incident light propagates through substrate 410 and dielectric layer 420. The method further includes diffracting the light beam to form a reflected order (716) and propagating the reflected order through the at least one dielectric layer (718). As illustrated in FIG. 4, the reflected order comprises an m=−1 order. In some embodiments, the reflected order is the only diffracted order.

In some embodiments, the method additionally includes propagating the reflected order through the incident light surface of the dielectric substrate as illustrated in FIG. 4. The immersion grating can be disposed in an ambient atmosphere that may be protected, for example, using a cover similar to cover 650 illustrated in FIG. 6.

It should be appreciated that the specific steps illustrated in FIG. 7 provide a particular method of operating an immersion grating according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
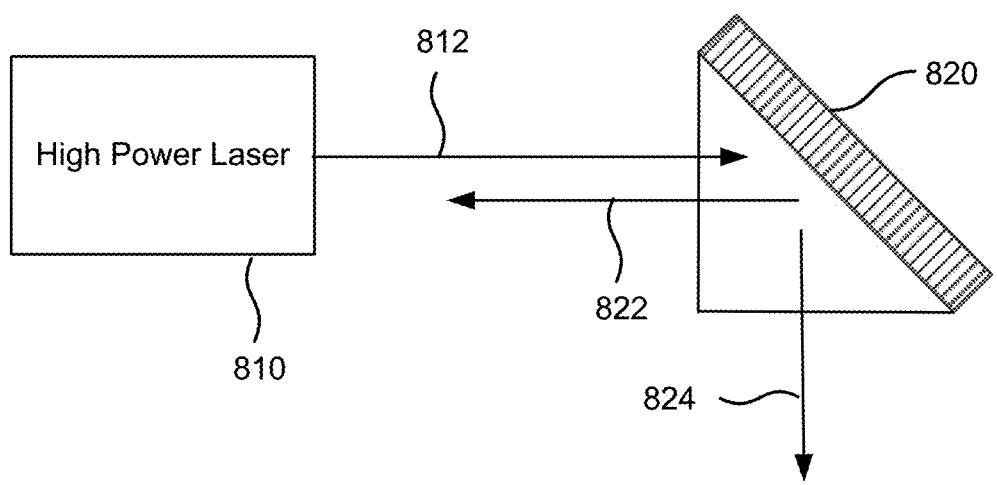
FIG. 8 is a simplified schematic diagram illustrating a high power laser system utilizing an immersion grating according to an embodiment of the present invention.

FIG. 8 is a simplified schematic diagram illustrating a high power laser system utilizing an immersion grating according to an embodiment of the present invention. As illustrated in FIG. 8, high power laser system 800 includes high power laser 810, which emits light that is incident on immersion grating 820. The emitted light beam is represented by incident beam 812. Diffraction from immersion grating 820 in the m=−1 order results in diffracted beam 822. As described herein, using embodiments of the present invention, the diffraction efficiency with which diffracted beam 822 is diffracted is over 99% over a wavelength range from 1041 to 1066, resulting in 99% of the power present in incident beam 812 being present in diffracted beam 822. The reflected beam 824 includes power that is lost, which is less than 1% of the power in incident beam 812. The diffraction efficiency in both the TE and TM polarizations are considered in the design of the immersion grating to ensure that the reflective loss present in the m=0 order will not result in damage to system components, for example, components that absorb the reflective loss, if the high power laser is operating in an undesired polarization state.

In spectral beam combining applications, which are suitable for the immersion gratings described herein, the incident power is on the order of 100 kW to 500 kW. In these applications, power that is not diffracted as desired ends up being lost. This lost power is typically captured and dissipated in one of several ways. As a result, for an immersion grating operating at 99% diffraction efficiency over a predetermined wavelength range as described herein, a 1% loss of power amounts to 1 KW-5 kW of laser power that must be captured and dissipated. Due to these high power levels associated with lost power, the high efficiency immersion gratings provided by embodiments of the present invention enable applications that cannot be satisfied by gratings operating at lower efficiencies, particularly efficiencies less than 99%. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An immersion grating comprising:
 a dielectric substrate having an incident light surface and a second surface opposing the incident light surface, wherein the dielectric substrate is characterized by a substrate index of refraction;
 a dielectric layer coupled to the second surface of the dielectric substrate, wherein the dielectric layer is characterized by a layer index of refraction greater than the substrate index of refraction and a predetermined thickness D, wherein the dielectric layer includes:
  a first portion of the dielectric layer having a first thickness $d_1$; and
  a second portion of the dielectric layer have a second thickness $d_2$, wherein $D=d_1+d_2$ and a periodic structure is formed in the second portion of the dielectric layer, wherein the immersion grating is characterized by a dispersion at Littrow of less than or equal to 2.0 radians/μm and a diffraction efficiency greater than 99% over a wavelength range from 1041 nm to 1066 nm.

2. The immersion grating of claim 1 further comprising an ambient environment, wherein the periodic structure is immersed in the ambient environment.

3. The immersion grating of claim 2 wherein there is no material present between the periodic structure formed in the dielectric layer and the ambient environment and between the second surface and the dielectric layer.

4. The immersion grating of claim 1 where an optical beam is incident on the periodic structure from the dielectric layer.

5. The immersion grating of claim 1 wherein the dielectric layer is metal-free.

6. The immersion grating of claim 1 wherein the immersion grating only supports reflected orders.

7. The immersion grating of claim 1 wherein the dielectric layer consists of a single material.

8. The immersion grating of claim 1 wherein the periodic structure comprises a one-dimensional diffraction grating.

9. The immersion grating of claim 8 wherein the immersion grating is configured to only produce an m=0 and an m=−1 diffraction orders.

10. The immersion grating of claim 1 wherein the dielectric substrate comprises fused silica.

11. The immersion grating of claim 1 wherein the layer index of refraction ranges between 1.9 and 2.2 over the wavelength range from 1030 to 1080 nm.

12. The immersion grating of claim 1 wherein the dielectric layer comprises at least one of tantalum pentoxide or hafnium oxide.

13. The immersion grating of claim 1 wherein D is between 0.45 μm and 0.85 μm.

14. The immersion grating of claim 1 wherein $d_2$ is between 0.25 μm and 0.35 μm.

15. The immersion grating of claim 1 wherein the periodic structure is characterized by a duty cycle of between 0.20 and 0.35.

16. An immersion grating prism comprising:
a prism having an incident light surface, an optical surface, and a third surface, wherein the prism is characterized by a prism index of refraction;
a dielectric layer coupled to the optical surface, wherein the dielectric layer is characterized by a layer index of refraction greater than the prism index of refraction and a predetermined thickness D, wherein the dielectric layer includes:
a first portion of the dielectric layer having a first thickness $d_1$; and
a second portion of the dielectric layer have a second thickness $d_2$, wherein $D=d_1+d_2$ and a periodic structure is formed in the second portion of the dielectric layer, wherein the immersion grating prism is characterized by a dispersion at Littrow of less than or equal to 2.0 radians/μm and a diffraction efficiency greater than 99% over a wavelength range from 1041 nm to 1066 nm.

17. The immersion grating prism of claim 16 wherein the periodic structure is configured to produce a diffracted order passing through the incident light surface.

18. The immersion grating prism of claim 17 wherein the diffracted order is the m=−1 order.

19. The immersion grating prism of claim 16 wherein the dielectric layer comprises at least one of tantalum pentoxide or hafnium oxide.

20. The immersion grating prism of claim 19 further comprising an ambient environment adjacent the periodic structure, wherein there is no material present between the periodic structure and the ambient environment and between the optical surface and the dielectric layer.

* * * * *

UNITED STATES PATENT AND TRADEMARK OFFICE
CERTIFICATE OF CORRECTION

| | | |
|---|---|---|
| PATENT NO. | : 12,339,473 B2 | Page 1 of 1 |
| APPLICATION NO. | : 17/397348 | |
| DATED | : June 24, 2025 | |
| INVENTOR(S) | : John R. Marciante and Jordan P. Leidner | |

It is certified that error appears in the above-identified patent and that said Letters Patent is hereby corrected as shown below:

In the Specification

Please insert the following heading and paragraph in Column 1, Line 10 of the description, immediately following the first full paragraph:
--STATEMENT REGARDING FEDERALLY SPONSORED RESEARCH OR DEVELOPMENT
This invention was made with Government support under Contract FA9451-18-C-0093 awarded by The United States Air Force. The Government has certain rights in the invention.--

Signed and Sealed this
Thirtieth Day of December, 2025

John A. Squires
*Director of the United States Patent and Trademark Office*